United States Patent
Petersen

[11] Patent Number: 6,086,040
[45] Date of Patent: Jul. 11, 2000

[54] VALVE AND A PNEUMATIC CONTROL VALVE NON-ROTATABLY JOINED BY A COUPLING

[75] Inventor: Poul Skadborg Petersen, Brædstrup, Denmark

[73] Assignee: APV Fluid Handling Horsens A/S, Horsens, Denmark

[21] Appl. No.: 09/297,940

[22] PCT Filed: Nov. 7, 1997

[86] PCT No.: PCT/DK97/00510

§ 371 Date: May 3, 1999

§ 102(e) Date: May 3, 1999

[87] PCT Pub. No.: WO98/20271

PCT Pub. Date: May 14, 1998

[51] Int. Cl.[7] .................................................. F16K 31/143
[52] U.S. Cl. .......................... 251/128; 251/63.6; 251/291
[58] Field of Search ................... 251/63.6, 128, 251/291

[56] References Cited

U.S. PATENT DOCUMENTS

| | | | |
|---|---|---|---|
| 2,438,776 | 3/1948 | Boylan | 251/128 |
| 2,647,538 | 8/1953 | Demay | 251/128 |
| 3,115,330 | 12/1963 | Dollison . | |
| 3,789,875 | 2/1974 | McGee | 137/553 |
| 3,993,284 | 11/1976 | Lukens, Jr. | 251/63.6 |
| 4,018,418 | 4/1977 | Dion-Biro | 251/63.6 |
| 5,429,304 | 7/1995 | Tomita et al. | 239/119 |
| 5,560,824 | 10/1996 | Sann et al. | 210/234 |
| 5,715,864 | 2/1998 | Andel et al. | 137/563 |

FOREIGN PATENT DOCUMENTS

| | | |
|---|---|---|
| 0 177 620 | 4/1986 | European Pat. Off. . |
| 270430 | 4/1929 | Italy ........................................ 251/128 |

Primary Examiner—Kevin Shaver
Assistant Examiner—David A. Bonderer
Attorney, Agent, or Firm—McDermott, Will & Emery

[57] ABSTRACT

In a valve assembly (1) comprising a pressure medium operated valve (2) and a control unit (5) which is mounted on the end of the actuator (3,4) facing away from the valve (2), the control unit (5) comprises a pressure medium passage (17) having a first end for supplying a pressure medium. The control unit (5) is provided with a coupling (26,27) on the end facing the actuator for releasable connection with coupling members (25) on the actuator (3,4) at axial, non-rotational joining with the actuator (3,4). A second end of the pressure medium passage (17) ends in a branch (20) or opening for pressure medium tight connection with an opening (21) or a branch respectively in the actuator (3,4) at the joining. A usually closed valve member (18) is inserted into the pressure medium passage (17) and has a member (24) connected to the moveable part of the valve member and projecting through the control unit (5), the outer end of said member abutting the actuator (3,4) at the joining, whereby the valve member (18) is opened, for instance against the force from a spring or against differential pressure. As a result the control unit (5) can be mounted and dismounted by a plug-in connection at the same time as the valve member (18) is automatically opened and closed.

9 Claims, 5 Drawing Sheets

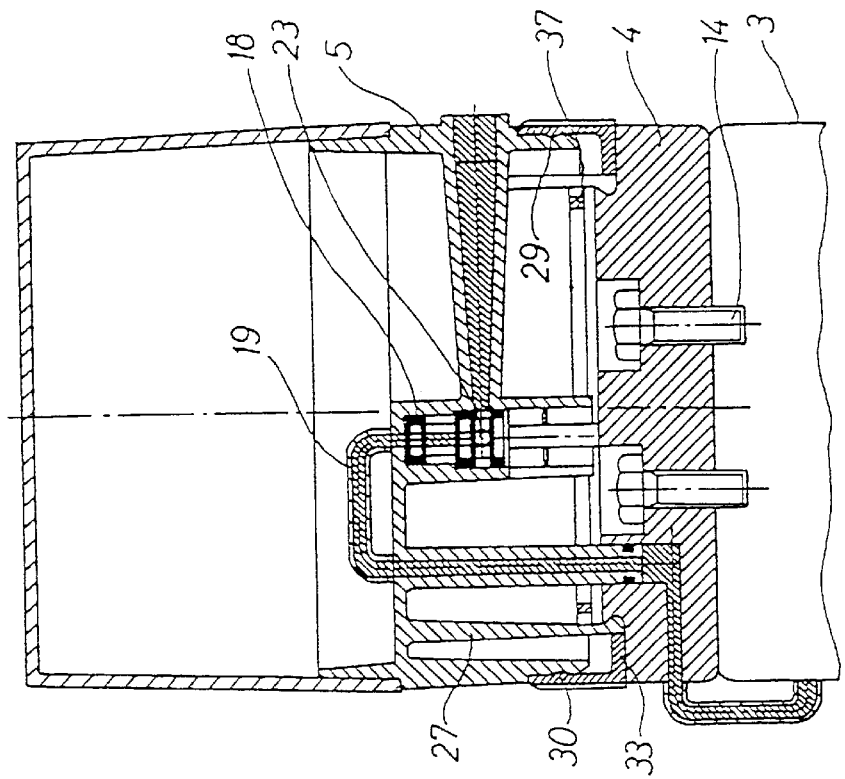
Fig. 3
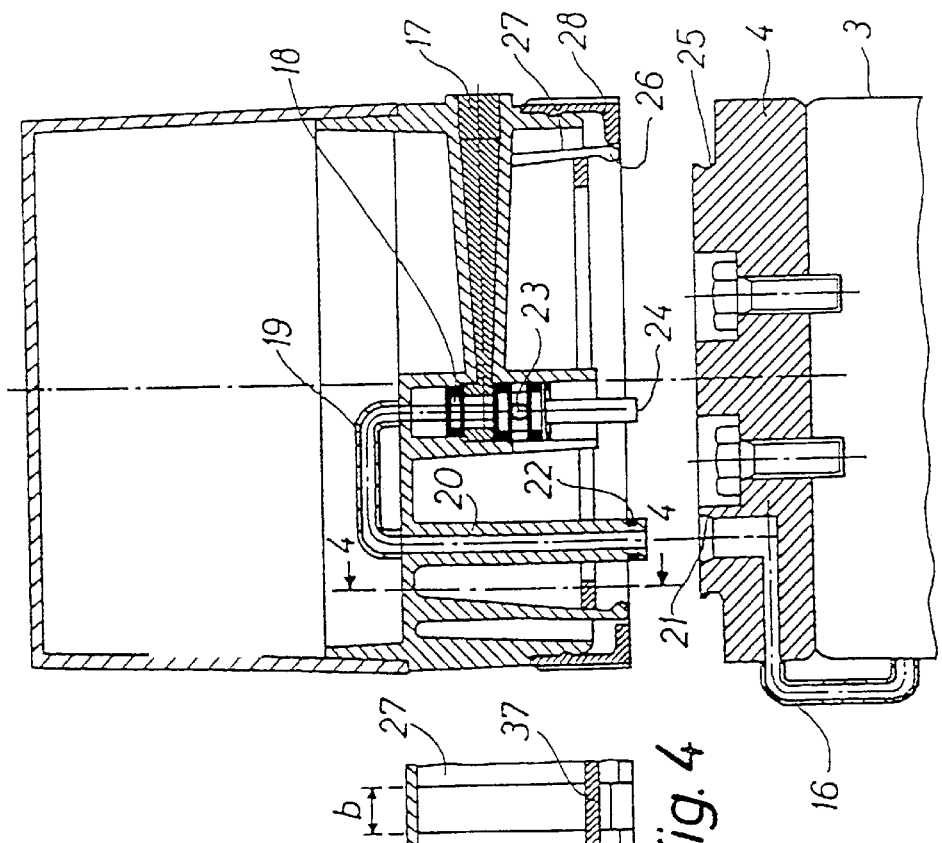
Fig. 2
Fig. 4

VALVE AND A PNEUMATIC CONTROL VALVE NON-ROTATABLY JOINED BY A COUPLING

TECHNICAL FIELD

The invention relates to a valve assembly of the type described in the preamble to claim 1.

BACKGROUND ART

Such a valve assembly is partly known from EP patent No. 0.177.620 relating to a pressure medium operated valve with an actuator mounted thereon, but without an actual control unit, the pressure medium connectors communicating directly with the actuator, whereby an elaborate net of pressure medium connectors are required.

The applicant of the present invention has previously used a valve assembly which also comprises a control unit secured to the end of the actuator facing away from the valve by means of screws.

In addition to the pressure medium passage the control unit often comprises solenoid valves with coherent electrical wires having control signals introduced into the control unit.

When a valve assembly is to be serviced it is often necessary to remove the other process equipment from the valve assembly. It is thus necessary to the disconnect the pressure medium supply and the electrical control signal wires. The pressure medium supply, which often is compressed air, is typically discontinued by dismounting and breaking off the hose, while the electrical signal is disconnected by dismounting the wires from a terminal board or by dismantling a plug.

BRIEF DESCRIPTION OF THE INVENTION

The object of the present invention is to facilitate service of such valve assemblies.

This object is obtained by the valve assembly stated in the introduction being shaped in the manner described in the characterising part of claim 1.

The control unit with which the said process equipment, such as a pressure medium and electrical control signal wires, if any, are connected, is thus secured to the actuator by its coupling means engaging the coupling means of the actuator such that the this securing acts as a plug-in connection making it possible to separate the control unit from the actuator in a single grip. The process equipment is coherent with the control unit at the dismounting.

Moreover as stated in claim 1, the pressure medium connection communicates with the actuator by means of a branch/opening connection from the other end of the pressure medium passageway. Due to the non-rotational joining, a connection of this type can be performed quite simply by joining the control unit and the actuator in axial direction. Other embodiments of the connection may of course also be used for instance tubes fitting inside one another or openings in the control unit and in the actuator with sealing ring, e.g O-rings abutting one another. Such optional embodiments for axial joining connections are also covered by the invention.

As the control unit is not secured to the actuator by means of screws or the like, a reduced number of openings is used in the control unit in relation to prior art.

Finally as stated in claim 1, the control unit also comprises a valve member which is only open when the control unit is connected to the actuator. When the control unit is separated from the actuator the valve member automatically closes the pressure medium passage, whereby the dismounting of a hose from the first end of the pressure medium passage is rendered superfluous.

In short it is very easy to mount or dismount the control unit by means of the coupling means and at the dismounting to automatically discontinue the pressure medium supply, e.g compressed air, and re-establish this at the mounting.

BRIEF DESCRIPTION OF THE DRAWINGS

The invention is explained in greater detail below with reference to the accompanying drawings, in which FIG. 2 illustrates the control unit of the valve assembly and the uppermost portion of the actuator, the head hereof partly in cross-section, and the control unit being dismounted from the actuator, FIG. 3 illustrates the same as FIG. 2, the control unit however connected with the actuator, FIG. 4 illustrates a section along the line 4–4 in FIG. 2.

BEST MODE FOR CARRYING OUT THE INVENTION

Figure 1:
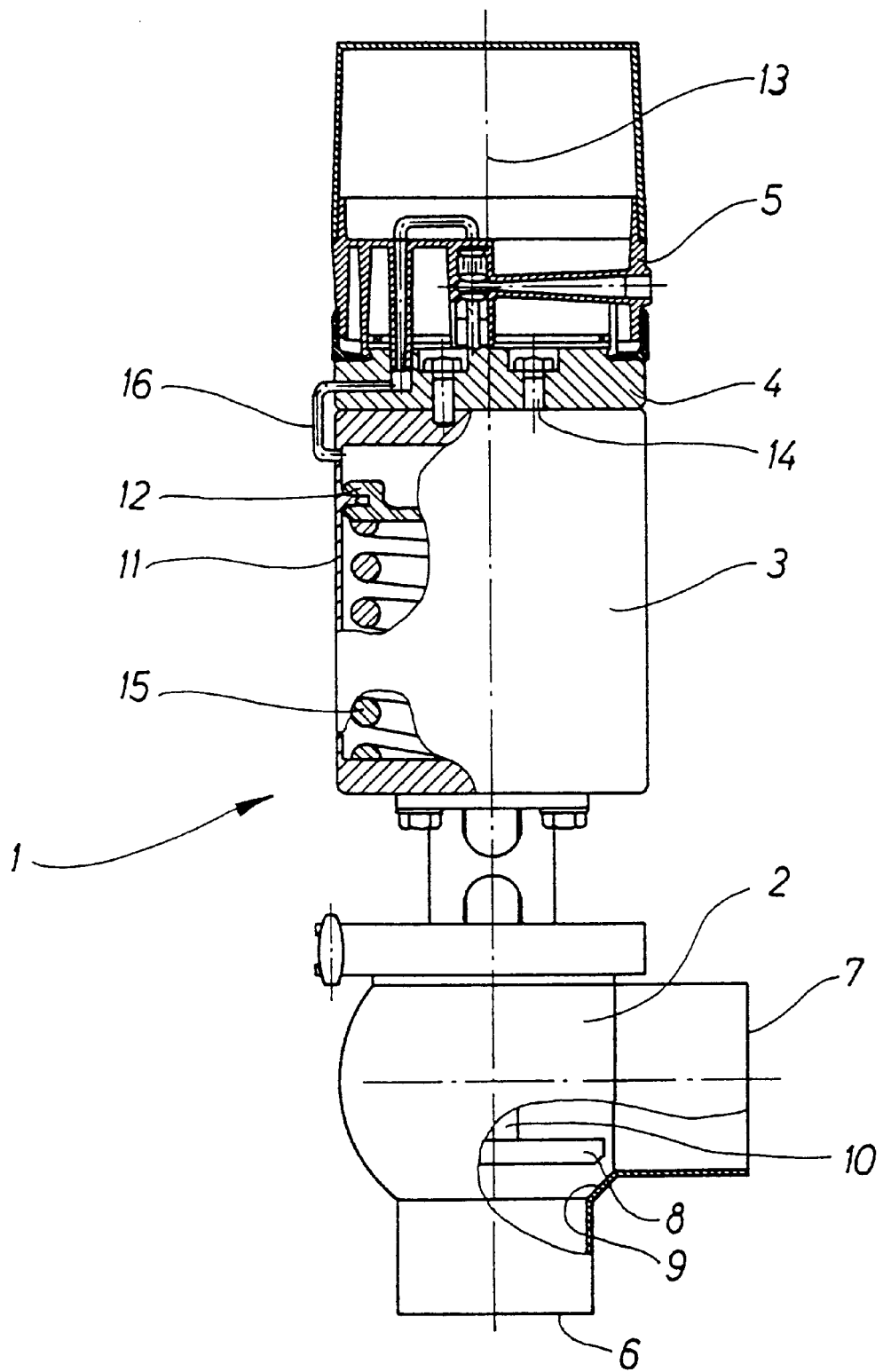
FIG. 1 is a side view of a valve assembly according to the invention, partly in section.

The valve assembly 1 shown in FIG. 1 is substantially formed of three parts, viz. a valve 2, an actuator 3 with a head 4 and a control unit 5.

The valve 2 serves for instance to conduct a fluid or a gas from a tube 6 to another tube 7. The valve 2 can be closed by means of a valve cone 8 which is made to abut a valve seat 9, the valve cone 8 communicating with a valve spindle 10. The actuator 3 is a cylinder 11 with a piston 12 whose axis 13 is co-axial with the valve spindle 10 mechanically connected to the piston 12. As a result the position of the valve cone 8 in relation to the valve seat 9 can be determined by means of the position of the piston 12 in the actuator 3.

The head 4 of the actuator 3 is secured to the end of the actuator 3 facing away from the valve 2 by means of bolts 14 and according to the invention is to be considered as a part of the actuator.

In the shown embodiment the piston 12 is moved upwards in the direction away from the valve 2 by means of a spring 15. The movement of the piston 12 toward the valve 2 for closure hereof is obtained by means of an air pressure supplied from the control unit 5 through a hose or a tube 16 as described in detail below.

As illustrated in FIG. 3, in which the control unit 5 is shown mounted on the head 4 of the actuator 3, compressed air is supplied to a pressure medium passage 17 through a threaded hose (not shown), the inlet of the passage 17 provided on the side of the control unit 5. The compressed air is advanced through an open valve member 18 shown in FIG. 3 and subsequently via a tube 19 to a branch 20, the end thereof being inserted in pressure-proof state into an opening 21 in the head 4 of the actuator. The insertion of the branch 20 into the opening 21 is made pressure-proof by means of an O-ring 22. The opening 21 communicates with the tube 16 through a passage in the head 4 of the actuator, said tube leading to the actuator 3 on the side of the piston 12 opposite the spring 15.

In FIG. 3 the valve member 18 is open by a small hole 23 connecting the pressure medium passage 17 with the tube 19 through the interior of the valve member 18.

FIG. 2 illustrates the same as FIG. 3, although with the exception that the control unit 5 is removed from the head 4 of the actuator 4. As a result the valve member 18 is automatically closed, the valve member in the shown embodiment comprising two piston parts of different diameters which both are subjected to the pressure from the pressure medium passage 17. The major portion of the force against the two piston parts is applied in downward direction in FIG. 2, whereby the moveable parts of the valve member 18 and thus also the hole 23 are pushed downwards such that the valve member 18 remains closed. As illustrated in FIG. 2 the valve member 18 is provided with a projecting member 24 connected to the moveable part through the control unit. When the control unit changes from its dismounted position in FIG. 2 to its mounted position in FIG. 3 on the head 4 of the actuator 3, the projecting member 24 abuts the head 4 of the actuator and the valve member 18 is consequently pushed upwards against the force from the differential pressure on the two piston parts from the position shown in FIG. 2 to the position shown in FIG. 3, ie from its closed state to its open state. The valve member 18 can of course be kept closed by other means than a differential pressure, eg spring power or any other suitable force. Usually gravity cannot be used for keeping the valve member 18 closed in its dismounted position shown in FIG. 2, as the control unit 5 of the valve assembly not always faces as shown on FIGS. 2 and 3.

On the head 4, which is the uppermost portion of the actuator 3, a circular, outwardly facing and circumferential groove 25 is provided and at the mounting of the control unit 5 is adapted to receive inwardly facing projections 26 provided on each of a number of finger portions 27 facing the actuator and secured to the control unit 5. In the present case the control unit is provided with a total of six finger portions evenly distributed along a circle being co-axial with the axis 13 as is the groove 25. FIG. 4 illustrates a finger portion 27 having inwardly facing projections 26. The approximate width b of the finger portion in relation to the its length is shown in this FIG.

Furthermore the control unit 5 is provided with a union 28 pivotally secured to the control unit 5, the union 28 having an inwardly projecting rim 29 pivotal in an outwardly facing groove 30 in the control unit 5.

Figure 5:
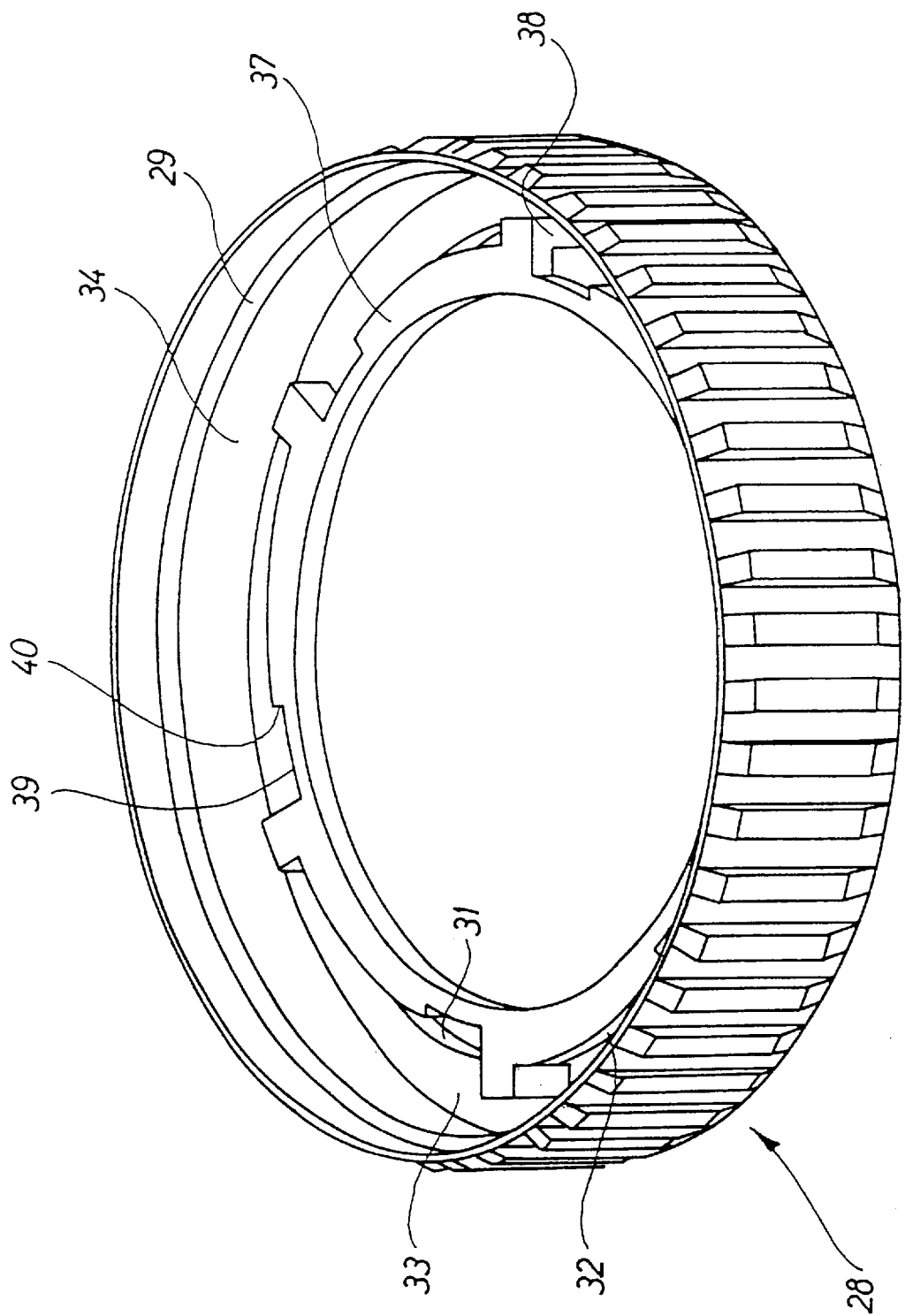
FIG. 5 is a perspective and top view of a union mounted on the control unit and contributing to the joining of the control unit and the actuator.
Figure 6:
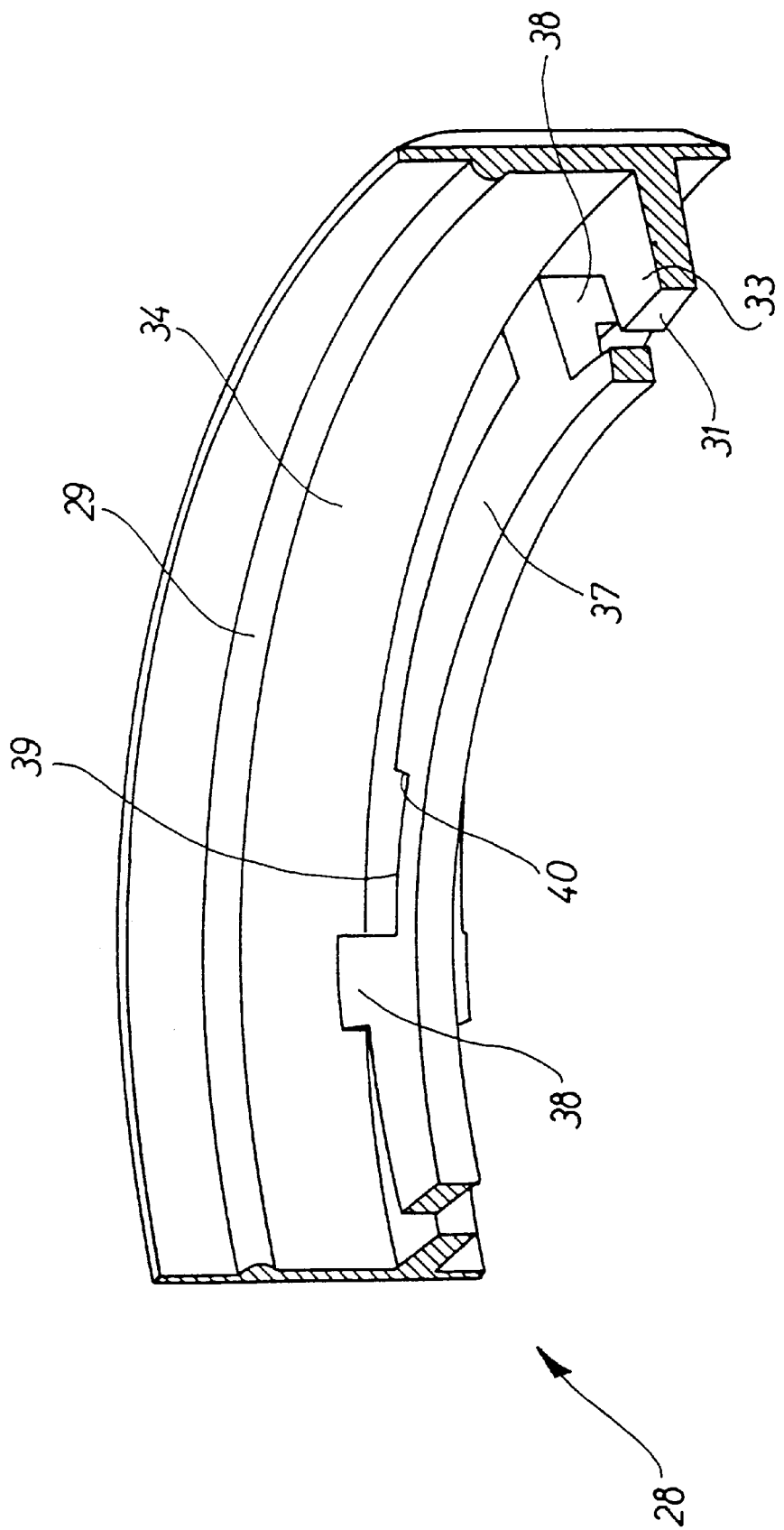
FIG. 6 is a perspective, sectional and enlarged view of the union in FIG. 5.

The union 28 is illustrated in detail in FIG. 5 showing the union 28 in perspective and in an inclined top view in relation to FIGS. 2 and 3. Further a section of the union 28 is shown in an enlarged and perspective view in FIG. 6. As illustrated in FIGS. 5 and 6 the union is provided with a first set of cam disc sections, the number of sections corresponding to the number of finger portions 27, ie in the shown example six cam disc sections 31, of which one extends from the point A to point B in FIG. 7. The cam disc sections 31 are arranged on the exterior of the finger portions 27 and extend thus inclined in relation to the finger portions 27 that when the union is turned in one direction, ie clockwise in FIGS. 5, 6 and 7, said sections gradually force the finger portions 27 into the outwardly facing groove 25 of the actuator 3,4.

The union 28 is further provided with a second set of cam disc sections, the number of sections corresponding to the number of finger portions 27, ie in the present embodiment six cam disc sections 32 arranged inside the finger portions 27 and extend thus inclined relative to the finger portions 27 that when the union 28 is turned in the other direction, ie counter-clockwise in FIGS. 5 and 6, said section gradually force the finger portions out of the outwardly facing groove 25 of the actuator 3,4.

In the shown embodiment, the first set of cam disc sections, ie the six cam disc sections 31, is provided on the inner face of a first ring 33, the outer face thereof being secured to the inner wall 34 of the union 28. The second set of cam disc sections 32 are provided on the outer face of a second ring 37 co-axially secured to the first ring 33. In the shown embodiment the second ring 37 is secured to the first ring 33 at positions between the ends of the individual cam disc sections 31,32 by means of connecting members 38. Thus, in the shown embodiment six such connecting members 38 are used. As a result when seen in the axis direction 13 the second ring 37 is arranged inside the projections 26 of the springy finger portions 27, while the first ring 33 substantially is arranged outside these projections 26.

A further groove 39 of a depth corresponding to the projection 26 of the finger portions 27 is provided on a length of those portions of cam disc sections 32 of the second ring 37 closest to the axis 13 of the union 28 in the inclined position, said length slightly exceeding the width b of each of the springy finger portions 27 of the control unit 5, thus providing a rim 40 or discontinuity in each of the cam disc sections 32 of the second ring 37.

The further grooves 39 stated above serve to facilitate the mounting of the union 28 on the control unit 5, the further grooves 39 causing the finger portions 27 with their inwardly facing projections 26 to be easily arranged on the second ring 37, at the same time as the finger portions 27 are arranged inside the first ring 33 at the corresponding point housing the further groove 39. The union 28 is then pushed deeper into the control unit 5, until its rim 29 engages the groove 30 of the control unit 5. It is not intended that the union 28 is to be removed from the control unit 5 at this point.

Figure 7:
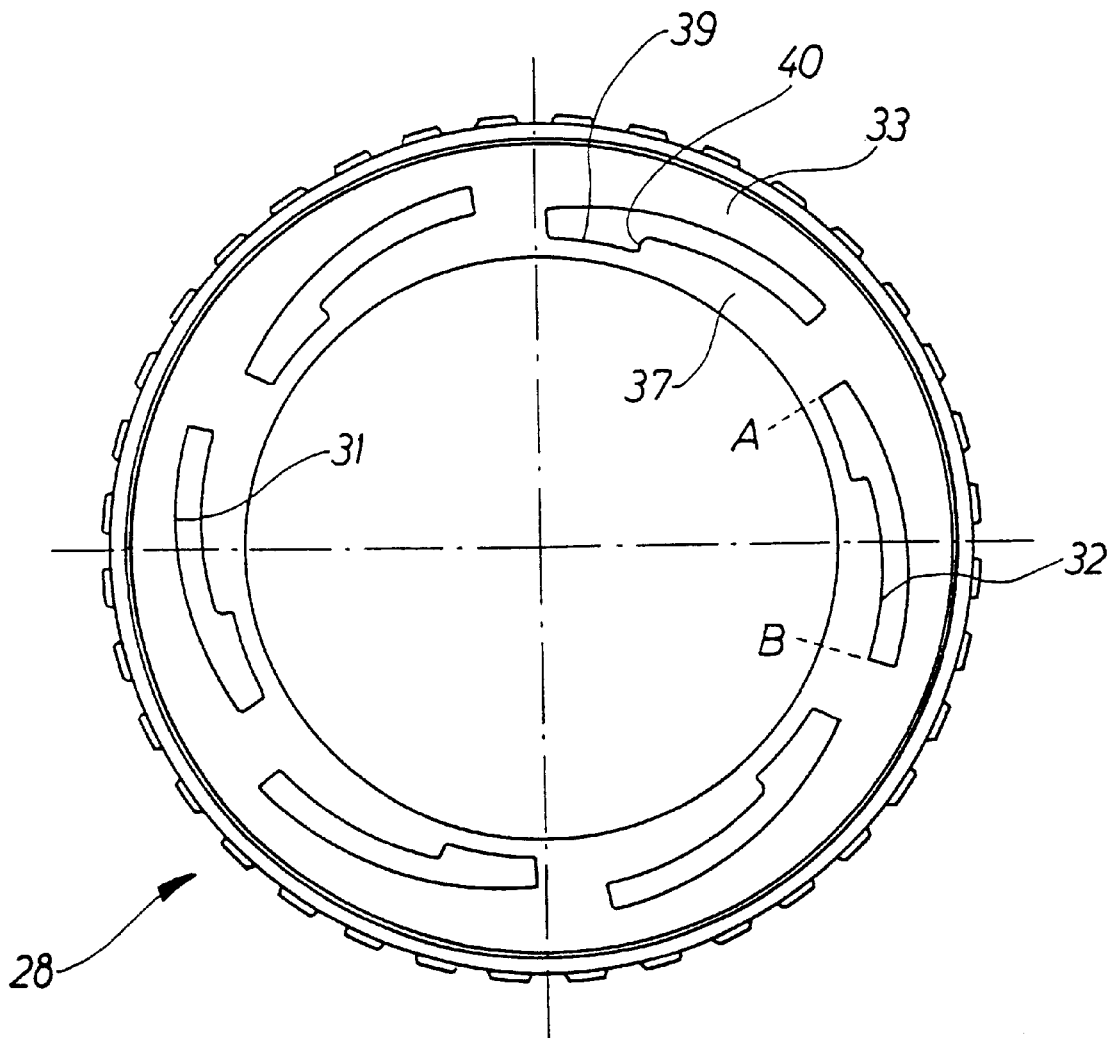
FIG. 7 is a simplified picture of the union seen from above for illustrating the cam disc sections on the first ring and on the second ring, the rings, however, not being in the same plane.

Prior to mounting the control unit 5 on the actuator 3, the union 28 is turned counter-clockwise as seen in FIGS. 5–7 from the position in which the finger portions 27 are received in the grooves 39, whereby the finger portions 27 of the cam disc sections 32 of the second ring are gradually forced outwards as much as possible.

When the finger portions 27 are thus positioned, the control unit 5 may be arranged easily on the head 4 of the actuator 3 in the position thereof, in which the branch 20 engages the opening 21. During this operation the projecting member 24 of the valve member 18 is made to abut the head 4, whereby the valve member 18 is opened.

The union 28 is then turned clockwise, whereby the cam disc sections 31 of the first ring 33 are made to abut the outer face of the finger portions 27 and push these toward the groove 25 such that the inwardly facing projections 26 of the finger portions 27 are brought into locking engagement in the groove 25. As a result the pressure medium (in the shown embodiment compressed air) has access from the passage 17 through the valve member 18, the tube 19, the branch 20 and the opening 21 to the tube 16 and thus to the upper face or the face of the piston 12 opposite the spring 15. Thus in the shown embodiment the compressed air can be used for closing the valve 2. Conversely if the compressed air is interrupted at a point before the valve assembly, viz in a circuit outside the assembly, the valve 2 is opened due to the pressure of the spring 15 against the piston 12.

Although such an example is not shown the control unit 5 may of course comprise for instance solenoid valves forming part of the connection through the tube 19 such that the compressed air can be interrupted in this tube 18, whereby the valve 2 is opened. Such solenoid valves with their coherent control wires inserted through the housing of the control unit 5 may be arranged in a conventional manner in the control unit 5. The solenoid valves can further via tube connections divert the compressed air to the lower face of the piston in an in itself known manner such that the valve 2 can be opened or closed by means of the air pressure controlled by such a solenoid valve.

When the control unit arranged in a system comprising the valve assembly according to the invention is to be dismounted, the union 28 is merely turned counter-clockwise, whereby the cam disc sections 32 of the second ring 37 gradually force the finger portions 27 out of the groove 25 of the actuator 3,4 at the same time as the cam disc sections 31 of the first ring 33 are moved further away from the finger portions 27. The finger portions 27 and their inwardly facing projections 26 are thus released from the grooves 25 and the control unit 5 can be removed easily at the same time as its valve member 18 automatically shuts off the compressed air.

I claim:

1. A valve assembly comprising a pressure medium operated valve having a valve spindle communicating with a valve cone, an actuator connected to the valve, said actuator being a cylinder with a piston communicating with the valve spindle and a control unit mounted on the end of the actuator facing away from the valve for supplying pressure medium for movement of the piston of the actuator against spring power or any other power from a normal position, in which the valve is optionally opened or closed, to the opposite position, in which the valve is closed or opened, the control unit comprising a pressure medium passage having a first end for supplying a pressure medium, characterised in that the control unit is provided with coupling means on the end facing the actuator for releasable connection with coupling members on the actuator at axial, non-rotational joining with the actuator, a second end of the pressure medium passage ending in a branch or opening for pressure medium tight connection with an opening or a branch respectively in the actuator at the joining and a usually closed valve member is inserted into the pressure medium passage having a member connected to a moveable part of the valve member and projecting through the control unit, the outer end of said member abutting the actuator at the joining, whereby the valve member is opened.

2. A valve assembly as claimed in claim 1, characterised in that the coupling means on the control unit comprises a number of springy finger portions directed towards the actuator in the joining direction and provided with inwardly facing projections at each end, said finger portions being evenly distributed along a circle so as to enable the engagement of the projections with a circular, outwardly facing groove or parts hereof on the adjacent side of the actuator.

3. A valve assembly as claimed in claim 2, characterised in that the control unit is provided with a union pivotally arranged on the finger portions and having a first set of cam disc sections of a number corresponding to the number of finger portions, said sections arranged on the exterior of the finger portions and each extending thus inclined in relation to the finger portions that when the union is turned in one direction they gradually force the finger portions into an outwardly facing groove of the actuator.

4. A valve assembly as claimed in claim 3, characterised in that the union further is provided with a second set of cam disc sections of a number corresponding to the number of finger portions, said sections arranged inside the finger portions and each extending thus inclined in relation to the finger portions that when the union is turned in the other direction they gradually force the finger portions out of the outwardly facing groove of the actuator.

5. A valve assembly as claimed in claim 3, characterised in that the union is pivotally secured to the control unit by means of a rim/groove connection.

6. A valve assembly as claimed in claim 3, characterised in that the first set of cam disc sections is provided on the inner face of a first ring, the outer face of which being secured to the inner wall of the union, and that the second set of cam disc sections is provided on the outer face of a second ring being co-axially secured to the first ring either on the inner wall of the union or on the first ring.

7. A valve assembly as claimed in claim 2, characterised in that the second ring is secured to the first ring at positions between the ends of the individual cam disc sections by means of connecting members such that when seen in the axis direction the second ring is inside the projections of the springy finger portions, while the first ring is substantially outside these projections.

8. A valve assembly as claimed in claim 7, characterised in that a further groove of a depth corresponding to the projection of the finger portions is provided on a length of those portions of the cam disc sections of the second ring closest to the axis of the union in the inclined position, said length slightly exceeding the width (b) of each of the springy finger portions of the control unit, thus providing a rim or discontinuity in each of the cam disc sections of the second ring.

9. A valve assembly as claimed in claim 1, characterised in that the control unit of the actuator is provided with six springy finger portions and that the first ring and the second ring each has six cam disc sections.

* * * * *